Sept. 30, 1969  G. A. MARBERG  3,469,886
RADIAL ADJUSTMENT MEANS FOR BORING ARMS OF CONTINUOUS MINER
Original Filed Sept. 5, 1967  2 Sheets-Sheet 1

INVENTOR.
Gustaf A. Marberg
BY
ATTORNEYS

Sept. 30, 1969 G. A. MARBERG 3,469,886
RADIAL ADJUSTMENT MEANS FOR BORING ARMS OF CONTINUOUS MINER
Original Filed Sept. 5, 1967 2 Sheets-Sheet 2

INVENTOR.
Gustaf A. Marberg
BY
ATTORNEYS

United States Patent Office 3,469,886
Patented Sept. 30, 1969

3,469,886
RADIAL ADJUSTMENT MEANS FOR BORING ARMS OF CONTINUOUS MINER
Gustaf A. Marberg, Oak Park, Ill., assignor to Westinghouse Air Brake Company, Pittsburgh, Pa., a corporation of Pennsylvania
Continuation of application Ser. No. 665,392, Sept. 5, 1967. This application Oct. 28, 1968, Ser. No. 771,694
Int. Cl. E21c *13/00*
U.S. Cl. 299—80                                    7 Claims

ABSTRACT OF THE DISCLOSURE

Cutting diameter adjustment actuator for the boring arms of the boring head of a continuous mining machine. The adjustment means comprises a central adjustment shaft extending through the hollow drive shaft for the boring head, which has drive connection with motion translating means, for radially adjusting the boring arms. The drive to the adjustment shaft is in the form of a double planetary geared reduction device, the pitches of the gears of which are identical. The planetary is directly connected between the hollow drive shaft, rotatably supporting the boring head and the adjustment shaft. An independent motor is provided to drive the ring gear of one planetary. The ring gear of the other planetary is connected to the main supporting housing for the boring head. The planetary pinions of the double planetary are mounted on a common carrier rotating about an axis coaxial with the axis of rotation of the adjustment shaft. The pinions meshing with the stationary ring gear also mesh with a sun gear rotatable with the hollow drive shaft for the boring head. The pinions meshing with the rotatable ring gear mesh with a sun gear keyed to the adjustment shaft. The application of power to the rotatable ring gear effects relative movement between the hollow drive shaft and the adjustment shaft, to extend or retract the boring arms. When no power is applied to the ring gear, the two ring gears are held from rotation. This will hold the boring arms in selected positions of adjustment. Adjustment of the boring arms may, however, be attained by driving the rotatable ring gear by power either while the boring head is rotating or is stationary.

---

This application is a continuation of application Ser. No. 665,392, filed Sept. 5, 1967 and now abandoned.

SUMMARY OF THE INVENTION

Adjustment means and actuator therefor, to accurately control the cutting diameter of the boring arms of the boring heads of a continuous mining machine, either while the boring arms are rotating or stationary, by the use of two similar planetary geared reduction devices, one of which is connected with the drive shaft for the rotary boring head, and the other of which is connected with the adjustment means for the boring arms, in which a power means is provided to effect relative rotational movement between the adjustment shaft and the boring head drive shaft to extend or retract the boring arms.

A principal object of the present invention, therefore, is to provide a simple and improved form of adjusting mechanism for radially extending and retracting the boring arms of a rotary boring head of a continuous miner, either while the boring head is in or out of operation.

Another object of the invention is to simplify the adjustment means for the boring arms of a rotary boring head by utilizing a double planetary geared reduction device as the actuator for the adjustment means for the boring arms, by interconnecting one planetary device to the rotary boring arm to be driven therefrom, by connecting the other planetary device to the adjustment means for the boring arms, and by rotatably driving the other planetary device to effect relative movement between the adjustment means for the boring arms and the drive shaft for the boring head, to extend or retract the boring arms.

A still further object of the invention is to provide a simple and improved form of adjustment means and actuator therefor, for the boring arms of a rotatable boring head, in which all clutches and locking means for locking the boring arms in adjustment are eliminated by the use of a double planetary geared reduction device, interconnected between the drive shaft for the boring head and the adjustment shaft for the boring arms, and by using a separate motor for driving one of the planetary geared reduction devices for effecting relative movement between the drive shaft for the boring head and the adjustment means for the boring arms.

These and other objects of the invention will appear from time to time as the following specification proceeds and with reference to the accompanying drawings.

DESCRIPTION OF PREFERRED FORM OF INVENTION

Figure 2:
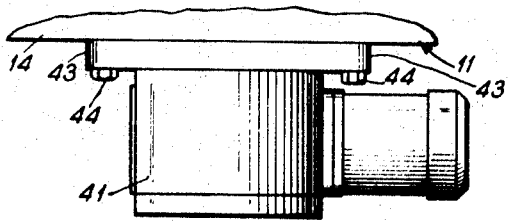
FIGURE 2 is a top plan view looking down along the rear wall of the main supporting housing for the boring head, and showing the housing for the adjustment actuator and the drive motor therefor.

In the embodiment of the invention illustrated in the drawings, I have generally shown a rotary boring head 10, rotatably supported in and projecting from a main supporting housing 11, for one or more rotary boring heads, in a conventional manner. The main supporting housing 11 is usually mounted at the forward end of the main frame for the mining machine, for vertical and angular adjustable movement with respect thereto. The present invention, however, is directed more particularly to the adjustment actuator for the radial boring arms of the boring heads 10, so the support for the main supporting housing need not be described in detail herein, and only one rotary boring head need be shown and described.

Figure 1:
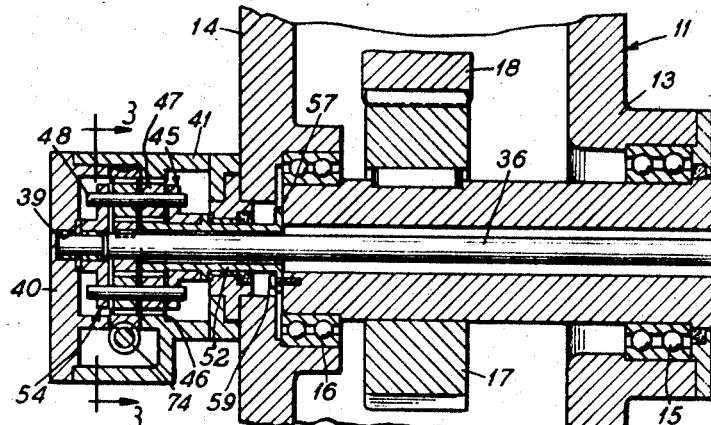
FIGURE 1 is a fragmentary vertical sectional view taken through a rotary boring head of a continuous mining machine and the support and drive means thereof.
Figure 3:
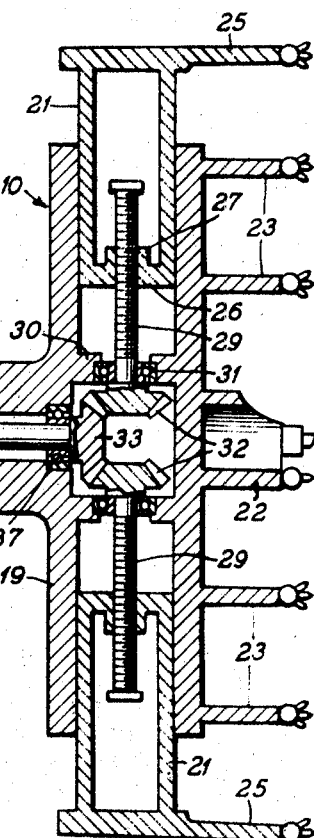
FIGURE 3 is an enlarged sectional view taken substantially along the line 3—3 of FIGURE 1.
Figure 3:
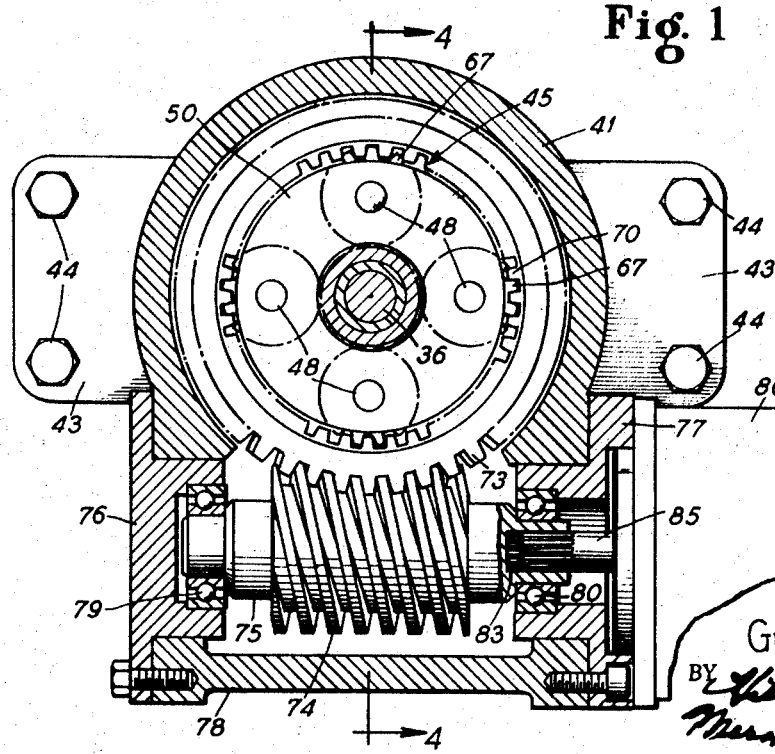

The rotary boring head 10, as shown in FIGURE 1, consists of a hollow drive shaft 12 projecting forwardly of the main supporting housing 11 and journalled in said main supporting housing in front and rear walls 13 and 14 thereof, on anti-friction bearings 15 and 16, respectively. The hollow drive shaft 12 has a gear 17, shown as being keyed thereto, and driven by reduction gearing 18 in the main supporting housing 11. The reduction gearing 18 is driven from a motor (not shown) mounted on the main supporting housing. An individual motor is provided for driving each boring head and the reduction gearing driving the two boring heads from their motors is tied together to effect rotation of the boring heads in timed relation with respect to each other in a conventional manner.

The hollow drive shaft 12 has a diametrically extending hollow boring arm 19, shown as being formed integrally therewith and having telescopic arms 21, 21 mounted therein for telescopic movement with respect to each other. The boring arm 19 has a central generally annular pilot cutter 22 projecting forwardly therefrom, and radially outwardly spaced cutter supporters 23, projecting forwardly therefrom and carrying the usual cutter blocks and cutter bits.

Each telescopic arm 21 is shown in FIGURE 1 as being hollow and mounted in the boring arm 19 for telescopic movement with respect thereto, and having a cutter support 25 projecting forwardly of its outer end and carrying the usual cutter bits for cutting a circumferential kerf in the mine face tangentially with the roof and floor of the mine. Suitable means (not shown) are provided to retain the telescopic arm 21 and cutter support 25 in aligned relation with respect to the boring arm 19.

Each telescopic arm 21 also has an inner end wall 26 having a hub 27 extending radially outwardly therefrom. The hub 27 is threaded and forms a nut for an adjustment screw 29, extending radially inwardly therefrom and journalled in a wall 30 extending across the inner end portion of the arm 19 on an anti-friction bearing 31. The inner end of the adjustment screw 29 has a miter gear 32 keyed or otherwise secured thereto and meshing with and driven from a miter gear 33 on the outer end of an adjustment shaft 36, journalled at its forward end in the hollow drive shaft 12 on an anti-friction bearing 37 and extending along the hollow drive shaft 12 beyond the rear end thereof. The rear end of the adjustment shaft 36 is journalled in a bearing 39 in an end wall 40 of a gear casing 41 projecting rearwardly of the rear wall 14 of the main supporting housing 11. The casing 41 has abutment plates 43 extending diametrically from opposite sides thereof and abutting the rear wall 14 of the main supporting housing 11, and secured thereto as by cap screws 44.

The diametrically opposed telescopic arm 21 is exactly like the telescopic arm 21 just described and is adjustably moved in the same manner, so the same part numbers will be applied to each telescopic arm and the adjustment means therefor.

The gear casing 41 forms a casing for a double planetary geared drive unit 45 directly and continuously connected between the hollow drive shaft 12 and the adjustment shaft 36, extending coaxially of said hollow drive shaft. The double planetary geared reduction drive unit includes an internal ring gear 46 formed integrally with the casing 41 and meshed with planetary pinions 47 rotatably mounted on shafts 48. Said shafts are mounted at their opposite ends in a cage 54 having spaced carriers 49 and 50 supporting the ends of said shafts 48. The carrier 49 has a hub 51, shown as journalled on a sleeve 52 on a bearing 53. The adjustment shaft 36 in turn is journalled within the sleeve 52 on a bearing 55. The sleeve 52 extends within the main supporting housing 11 through a sealing plate 56 and has a radial flange 57 at its inner end abutting the end of the hollow drive shaft 12 and secured thereto as by cap screws 59 (FIGURE 1). A sealing plate 56 is secured to an end plate 60 for the housing 41 as by cap screws 61 and has sealing means 62 carried therein extending about the sleeve 52. The sleeve 52 also has a sun gear 63 formed integrally therewith and meshing with the planetary pinions 47.

Since the housing 41 is mounted on the main supporting housing 11 and held from rotation, the planetary pinions 47 will walk about the internal gear 46 as they are rotatably driven by the sleeve 52, through the sun gear 63, driven by the hollow drive shaft 12.

Figure 4:
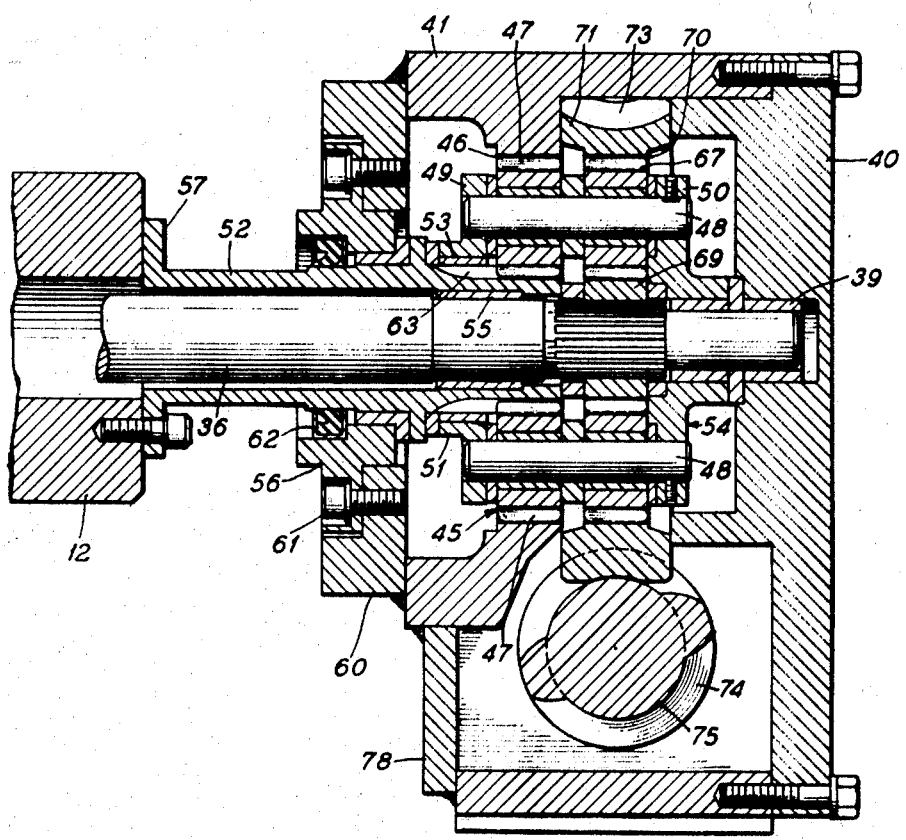
FIGURE 4 is an enlarged sectional view taken substantially along the line 4—4 of FIGURE 3.

The shafts 48 also have planetary pinions 67 rotatably mounted thereon. The planetary pinions 67 are of the same diameter as the planetary pinions 47 and mesh with and drive a sun gear 69, shown in FIGURE 4 as being splined to the adjustment shaft 36 and of the same diameter as the sun gear 63. The planetary pinions 67 also mesh with an internal gear 70, formed integrally with a ring 71 rotatably mounted in the casing 41. The ring 71 has external worm gear teeth formed integrally therewith, forming a worm gear 73. The worm gear 73 meshes with and is driven from a worm 74 on a worm shaft 75, journalled at its opposite ends in end caps 76 and 77 of a worm housing part 78 of the housing 41 and opening to the housing 41. Anti-friction bearings 79 and 80, carried in the end caps 76 and 77 form bearing supports for said worm shaft 75. Said worm shaft also has a splined coupling socket 83 in one end thereof, engaged by the splined end of a motor shaft 85 of a motor 86, herein shown as being a hydraulic motor.

The pitch of the teeth of the worm 74 and the worm gear 73 are such as to provide a self-locking worm and worm gear drive. When the worm 74 is not being driven, it locks the worm gear and the internal ring gear 70. Said internal ring gear then serves the same purpose as the internal gear 46. When the boring head is in operation and the internal ring gear 70 is stationary, the two sets of planetary pinions 47 and 67 will walk about their respective internal ring gears, driven by the sun gear 63 fixed to the hollow drive shaft 12. The planetary pinions 67 will also drive the sun gear 69 on the adjustment shaft 36. Since both sets of planetary gears are identical, the shaft 12 and the shaft 36 will rotate at the same rates of speed, and the telescopic arms 21 and cutter supports 25 will stay in their selected positions of adjustment.

When the telescopic arms 21 and cutter supports 25 are driven by the shaft 12, they may be adjusted by supplying power to the motor 86 to rotatably drive the worm gear 73 and internal ring gear 70. As the motor 86 is rotated in a direction to extend the telescopic arms 21 and cutter supports 25, the two sets of planetary pinions 47 and 67 on the common shafts 48, carried by the cage 54, will rotate at different speeds relative to one another.

The planetary pinions 47 meshing with the sun gear 63 and the stationary internal ring gear 46, will be driven by the shaft 12 to walk about the ring gear 46 and rotatably move the cage 54 therewith about the axis of the adjustment shaft 36.

The orbitally travelling planetary pinions 67 will be driven by the ring gear 70 and will drive the adjustment shaft 36 and miter gears 33 and 32 in directions to extensibly adjust the two telescopic arms 21 and cutter supports 25.

When the shaft 12 and cutter supports 25 are not rotating, the planetary pinions 47 meshing with the internal gear 46 and the cage 54, are fixed. As the motor 86 is supplied with power to rotatably drive the worm 74 and worm ring gear 73 in a selected direction of rotation, the internal gear 70 will rotatably drive the non-orbiting pinions 67 meshing with sun gear 69, to rotate said sun gear and drive the adjustment shaft 36, to set the cutting diameter of the boring head.

While I have herein shown and described one form in which the invention may be embodied, it may readily be understood that various variations and modifications in the invention may be attained without departing from the spirit and scope of the novel concepts thereof.

I claim as my invention:

1. In a boring type continuous mining machine having a frame,
   a boring assembly rotatably mounted on said frame comprising:
   a hollow shaft having at least one boring arm projecting radially therefrom,
   means mounting said boring arm for radial adjustment to vary the cutting diameter of the boring assembly,
   means for radially adjusting said boring arms including an adjustment shaft rotatably mounted within said hollow shaft,
   a motion translating connection from said adjustment shaft to said boring arm, the improvement comprising:
   a double planetary actuating device for said adjustment shaft comprising:
      a first sun gear attached to and driven from said hollow shaft,
      a second sun gear having driving connection with said adjustment shaft, two internal ring gears,
at least two planetary gears,
a common carrier for said planetary gears mounted for rotation about the axis of said hollow shaft,
one of said planetary gears meshing with one sun gear and one internal ring gear and the other of said planetary gears meshing with the other sun gear and its associated internal ring gear, and
means for rotatably driving one of said internal ring gears relative to the other of said internal ring gears to provide relative movement therebetween and to effect relative rotation between said hollow drive shaft and said adjustment shaft, to adjust the cutting diameter of said boring arm.

2. The structure of claim 1,
wherein said one internal ring gear is selectively fixed against rotation with respect to said other internal ring gear, to hold said boring arm in a fixed position of radial adjustment during rotation of said boring assembly.

3. The structure of claim 2,
wherein said means for rotatably driving said one internal ring gear comprises a worm and worm gear.

4. The structure of claim 1,
wherein a non-rotatable casing is provided for said double planetary actuating device,
wherein the internal ring gears, sun gears and planetary gears are all of the same diametral pitch,
wherein one internal ring gear is mounted in said casing for rotatable movement with respect thereto,
wherein the other internal ring gear is fixed to said casing, and
wherein the means for rotatably driving the internal ring gear comprises a self-locking driving connection.

5. The structure of claim 4,
wherein said one internal ring gear rotatably mounted in said casing has internal and external gear teeth forming a drive means therefor.

6. The structure of claim 5,
wherein the external gear teeth are worm teeth, and
wherein a power driven worm journalled in said casing is provided to mesh with said worm teeth, to rotatably drive said rotatable internal ring gear.

7. The structure of claim 6,
wherein the worm and worm gear teeth are self-locking worm and worm gear teeth,
wherein said power driven worm is driven by a hydraulic motor secured to said casing, and
wherein said motor has a drive shaft coaxial with said worm, and having direct coupling engagement therewith.

References Cited

UNITED STATES PATENTS

| | | | |
|---|---|---|---|
| 1,335,723 | 4/1920 | Campbell | 299—61 |
| 2,796,247 | 6/1957 | Sloane | 299—80 |
| 2,796,248 | 6/1957 | Sloane | 299—80 |
| 2,954,220 | 9/1960 | Bergman | 299—61 X |

ERNEST R. PURSER, Primary Examiner

U.S. Cl. X.R.

175—173